United States Patent
Chen

(10) Patent No.: US 11,170,510 B2
(45) Date of Patent: Nov. 9, 2021

(54) METHOD FOR DETECTING FLYING SPOT ON EDGE OF DEPTH IMAGE, ELECTRONIC DEVICE, AND COMPUTER READABLE STORAGE MEDIUM

(71) Applicant: Guangdong Oppo Mobile Telecommunications Corp., Ltd., Guangdong (CN)

(72) Inventor: Yan Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 173 days.

(21) Appl. No.: 16/535,835

(22) Filed: Aug. 8, 2019

(65) Prior Publication Data
US 2020/0098111 A1    Mar. 26, 2020

(30) Foreign Application Priority Data

Sep. 25, 2018 (CN) .......................... 201811113998.0

(51) Int. Cl.
*G06T 7/181* (2017.01)
*G06T 7/50* (2017.01)
(Continued)

(52) U.S. Cl.
CPC ............. *G06T 7/181* (2017.01); *G06T 1/20* (2013.01); *G06T 7/13* (2017.01); *G06T 7/50* (2017.01); *G06T 2200/04* (2013.01)

(58) Field of Classification Search
CPC .. G06T 7/181; G06T 7/50; G06T 7/13; G06T 1/20; G06T 2200/04; G06T 2207/10028;
(Continued)

(56) References Cited

U.S. PATENT DOCUMENTS

2005/0105826 A1* 5/2005 Yang ..................... G06T 3/4007
382/286
2010/0193588 A1 8/2010 Cherry
(Continued)

FOREIGN PATENT DOCUMENTS

CN    101729784 A    6/2010
CN    104683783 A    6/2015
(Continued)

OTHER PUBLICATIONS

Sabov,Alexander; Jörg Krüger, Identification and Correction of Flying Pixels in Range Camera Data.,SCCG 2008, Budmerice, Slovakia, Apr. 21-23, 2008, pp. 135-142 (Year: 2008).*
(Continued)

*Primary Examiner* — Matthew C Bella
*Assistant Examiner* — Kaleb Tessema
(74) *Attorney, Agent, or Firm* — Young Basile Hanlon & MacFarlane, P.C.

(57) ABSTRACT

Provided are a method and a device for detecting a flying spot on an edge of a depth image and an electronic device. The method includes the following. Image data of the depth image is collected. A normal vector of each pixel of the depth image is calculated according to the image data. An edge point of the depth image is calculated according to the normal vector with an edge detection operator. The edge point is taken as a seed point, and whether the seed point satisfies a growing condition is determined. Upon determining that the seed point satisfies the growing condition, the seed point is determined as the flying spot.

15 Claims, 3 Drawing Sheets

(51) Int. Cl.
  *G06T 7/13* (2017.01)
  *G06T 1/20* (2006.01)
(58) Field of Classification Search
  CPC ......... G06T 5/005; G06T 7/12; G06T 7/0002; G06T 17/00; G06T 2207/20156; G06T 2207/30201
  See application file for complete search history.

(56) References Cited

U.S. PATENT DOCUMENTS

| | | | |
|---|---|---|---|
| 2011/0206274 A1* | 8/2011 | Tateno | G06T 7/75 |
| | | | 382/154 |
| 2012/0098935 A1 | 4/2012 | Schmidt et al. | |
| 2014/0218684 A1 | 8/2014 | Kumar et al. | |

FOREIGN PATENT DOCUMENTS

| | | |
|---|---|---|
| CN | 104780355 A | 7/2015 |
| CN | 106716450 A | 5/2017 |
| CN | 107274446 A | 10/2017 |
| CN | 107292826 A | 10/2017 |
| KR | 20180103660 A | 9/2018 |
| WO | 2018021065 A1 | 2/2018 |

OTHER PUBLICATIONS

International search report issued in corresponding international application No. PCT/CN2019/098399 dated Oct. 29, 2019.
Extended European search report issued in corresponding European application No. 19190186.7 dated Sep. 16, 2019.
Yann Chene et al: "On the use of depth camera for 3D phenotyping of entire plants", Computers and Electronics in Agriculture, vol. 82, Mar. 1, 2012 (Mar. 1, 2012), pp. 122-127, XP055619295, Amsterdam, NL, ISSN: 0168-1699, DOI: 10.1016/j.compag.2011.12.007, p. 125; figure 6 p. 123; figures 1,2.
Jaesik Park et al: "High-Quality Depth Map Upsampling and Completion for RGB-D Cameras" IEEE Transactions on Image Processing, IEEE Service Center, Piscataway, NJ, US, vol. 23, No. 12, Dec. 1, 2014 (Dec. 1, 2014), pp. 5559-5572, XP011564809, ISSN: 1057-7149, DOI: 10.1109/TIP.2014.2361034 [retrieved on Nov. 18, 2014] the whole document.
Indian Examination Report for IN Application 201914032544 dated Apr. 29, 2021. (8 pages).

\* cited by examiner

METHOD FOR DETECTING FLYING SPOT ON EDGE OF DEPTH IMAGE, ELECTRONIC DEVICE, AND COMPUTER READABLE STORAGE MEDIUM

CROSS-REFERENCE TO RELATED APPLICATION(S)

This application claims priority to Chinese Patent Application No. 201811113998.0, filed on Sep. 25, 2018, the content of which is hereby incorporated by reference in its entirety.

TECHNICAL FIELD

This disclosure relates to the field of image processing, and more particularly to a method for detecting a flying spot on an edge of a depth image, an electronic device, and computer readable storage medium.

BACKGROUND

A three-dimensional (3D) image is generated mainly based on time of fight (TOF) technology. A distance to a surface of an object is calculated by measuring a difference between a time point at which an infrared light is emitted to the surface and a time point at which the infrared light is reflected back from the surface. As such, 3D geometric information on the surface of the object can be collected in real time, thereby generating a depth image of the object. However, when the TOF technology is adopted, a flying-spot effect (that is, discontinuity in measurement of depth due to a great difference in depth of field) may occur to an edge of an image. The flying-spot effect affects greatly the quality of a point cloud model generated and also affects the quality of a 3D depth image outputted. Currently, by adopting mainly operators such as sobel, canny, Laplace, or the like, a convolution operation is executed on the image to obtain a contour of the edge, and a pixel falling within the contour is regarded as a flying spot of discontinuity in depth and should be removed. However, the contour obtained by calculating in such a method has a pixel width which is difficult to adjust effectively with parameters of operators such as sobel, canny, etc., which may cause some effective pixels removed by mistake. Since pixels removed cannot occupy more than 1% of total pixels, error rate of such a method is excessively high, which does not meet requirements of users. In addition, such a method affects structural features of the image to some extent, which results in blurring of details of the image.

SUMMARY

According to first aspect of the disclosure, a method for detecting a flying spot on an edge of a depth image is provided. The method includes the following. Image data of the depth image is collected. A normal vector of each pixel of the depth image is calculated according to the image data. An edge point of the depth image is calculated according to the normal vector with an edge detection operator. The edge point is taken as a seed point, and whether the seed point satisfies a growing condition is determined. Upon determining that the seed point satisfies the growing condition, the seed point is determined as the flying spot.

According to a second aspect of the present disclosure, an electronic device is provided. The electronic device includes at least one processor and a computer readable storage. The computer readable storage is coupled to the at least one processor and stores at least one computer executable instruction thereon which, when executed by the at least one processor, causes the at least one processor to carry out the method for detecting a flying spot on an edge of a depth image according to the first aspect of the present disclosure.

According to a third aspect of the present disclosure, a non-transitory computer readable storage medium is provided. The non-transitory computer readable storage medium is configured to store a computer program which, when executed by a processor, causes the processor to carry out the method for detecting a flying spot on an edge of a depth image according to the first aspect of the present disclosure.

BRIEF DESCRIPTION OF THE DRAWINGS

The above and/or additional aspects and advantages will be clearer and easier to understand with descriptions of implementations below in conjunction with accompanying drawings.

DETAILED DESCRIPTION

Figure 1:
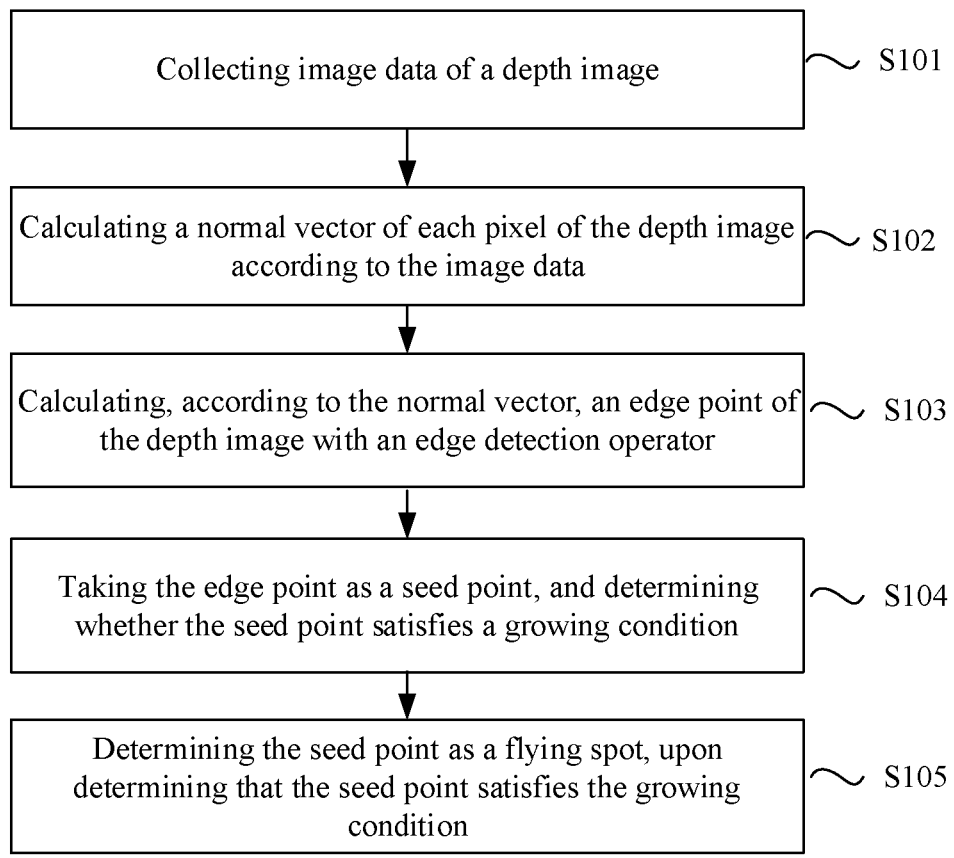
FIG. 1 is a flowchart of a method for detecting a flying spot on an edge of a depth image according to an implementation of the present disclosure.

Implementations of the present disclosure will be described in detail hereinafter. Examples of the implementations are illustrated in accompanying drawings. The same or similar reference numerals are used to denote the same or similar elements or elements having the same or similar functions. Implementations described below with reference to accompanying drawings are illustrative and are merely for explaining, rather than limiting, the present disclosure.

In the following, a method and a device for detecting a flying spot on an edge of a depth image and an electronic device according to implementations of the preset disclosure will be elaborated with reference to accompanying drawings.

FIG. 1 is a flowchart of a method for detecting a flying spot(s) on an edge of a depth image according to an implementation of the present disclosure. Various types of points such as flying spot, edge point, and seed point mentioned below are not limited to be one.

As illustrated in FIG. 1, the method includes the following.

At S101, image data of the depth image is collected.

The image data is used for representing a distance between a surface of a subject and an imaging plane. In this implementation, the image data of the depth image of the subject can be collected with an infrared array. An infrared signal is emitted with an infrared emitter to the subject and a first time point at which the infrared signal is emitted is recorded. After an infrared light illuminates the surface of the subject, an infrared signal reflected back from the subject is received with an infrared receiver after reflection, and a second time point at which the infrared signal reflected is received is recorded. A difference between the first time point and the second time point (that is, a TOF from when the infrared signal is emitted to when the infrared signal reflected or returned is received) is calculated. The image data is obtained according to the difference. In other words, each pair of infrared emitter and infrared receiver corresponds to a pixel. A difference between two time points can be used to calculate a distance between a pixel of the subject and the imaging plane. The image data of the subject is composed by combining data of multiple pixels.

At S102, a normal vector of each pixel of the depth image is calculated according to the image data.

A first vector $V_k(u, v)$ of each pixel of the depth image is acquired according to the image data, where u and v represent respectively 2D coordinates and 3D coordinates of the pixel and V represents a vector.

A second vector $V_k(u+1, v)$ and a third vector $V_k(u, v+1)$ of neighboring pixels of each pixel are acquired, where the second vector and the third vector are obtained by querying serial numbers of threads of a graphic processing unit (GPU). In other words, the second vector and the third vector can be obtained by querying directly ID (identities) of the threads of the GPU, that is, each of the second vector and the third vector corresponds to its own thread. By adopting multiple threads in parallel, calculating efficiency can be improved effectively.

The normal vector of each pixel is calculated according to the first vector, the second vector, and the third vector. In this implementation, the normal vector can be calculated based on Formula 1:

$$N_k(u)=m[(V_k(u+1, v)-V_k(u, v))\times(V_k(u, v+1)-V_k(u, v))] \quad \text{Formula 1}$$

$V_k(u+1, V)-V_k(u, v)$ represents a spatial vector calculated after a current pixel and its neighboring pixel are converted into 3D spatial points, and then normal vector $N_k(u)$ is obtained by cross product of the spatial vector, where $V_k(u)=K^{-1} u$, K represents an intrinsic parameter of a camera, which is preset, and $m(x)=x/\|x\|_2$.

At S103, an edge point of the depth image is calculated according to the normal vector with an edge detection operator.

In this implementation, the edge detection operator includes a sobel operator.

At S104, the edge point is taken as a seed point, and whether the seed point satisfies a growing condition is determined.

A first normal vector n of the seed point is acquired, and then a second normal vector of each of neighboring pixels of the seed point is acquired. In terms of direction, the "neighboring pixels of the seed point" can include neighboring pixels in eight directions, that is, top, top right, right, bottom right, bottom, bottom left, left, and top left. Therefore, in this implementation, there are eight second normal vectors of the neighboring pixels of the seed point, which can be denoted by $n_{i-1}^g$.

An absolute value of a product of the first normal vector and the second normal vector (that is, $abs(n \cdot n_{i-1}^g)$) is calculated.

Whether the absolute value is less than a preset threshold is determined. That is to say, when the absolute value is less than the preset threshold, determine that the seed point satisfies the growing condition; otherwise, determine that the seed point does not satisfy the growing condition.

At S105, upon determining that the seed point satisfies the growing condition, the seed point is determined as the flying spot.

In other words, when the absolute value of the product of the first normal vector and the second normal vector is less than the preset threshold, the seed point can be determined as the flying spot.

According to the method for detecting a flying spot on an edge of a depth image provided herein, the image data of the depth image is collected. The normal vector of each pixel of the depth image is calculated according to the image data. The edge point of the depth image is calculated according to the normal vector with the edge detection operator. The edge point is taken as the seed point, and whether the seed point satisfies the growing condition is determined. Upon determining that the seed point satisfies the growing condition, the seed point is determined as the flying spot. In this way, the flying spot which affects the depth image can be detected effectively and accurately and effective pixels can be kept, which improves accuracy rate of detection.

Figure 2:
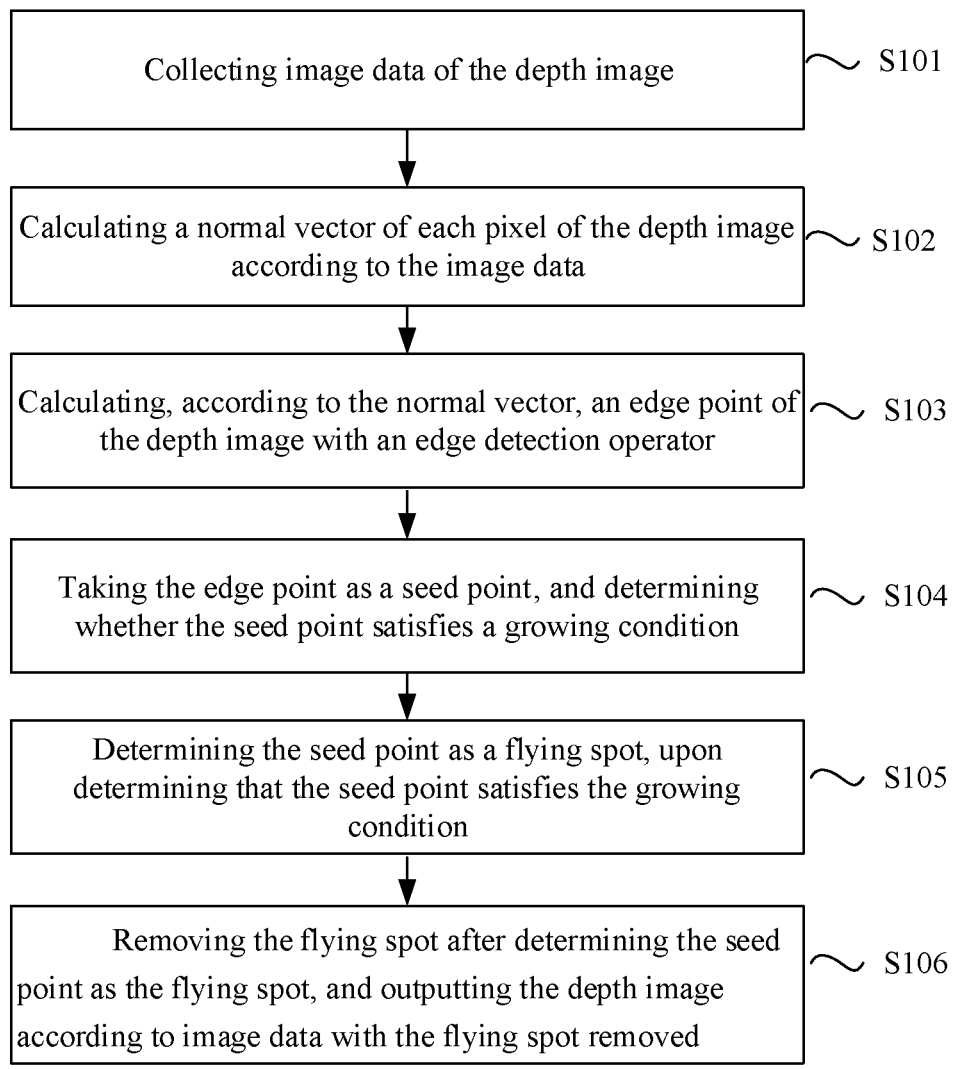
FIG. 2 is a flowchart of a method for detecting a flying spot on an edge of a depth image according to another implementation of the present disclosure.

In another implementation, as illustrated in FIG. 2, the method for detecting a flying spot on an edge of a depth image further includes the following.

At S106, the flying spot is removed after determining the seed point as the flying spot, and the depth image is outputted according to image data with the flying spot removed.

In a 3D scene reconstruction, by removing the flying spot, a trailing phenomenon at an edge of a flat area such as a wall, ground, or the like can be avoided, where the trailing phenomenon may cause an incorrect topological relationship between sets and affect the quality of a depth image outputted.

In a 3D face reconstruction, a trailing phenomenon at a facial contour from a single viewpoint can be avoided, whereby an authentic and precise face model can be outputted.

In a background blur scene, edge contour information of higher precision can be acquired, which reduces a pixel-level error of portrait segmentation from the background.

To realize the above implementations, a device for detecting a flying spot on an edge of a depth image is also provided in the present disclosure.

Figure 3:
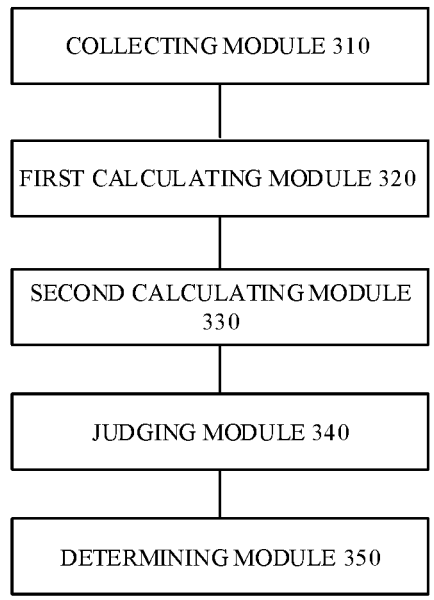
FIG. 3 is a structural block diagram of a device for detecting a flying spot on an edge of a depth image according to an implementation of the present disclosure.

FIG. 3 is a structural block diagram of a device for detecting a flying spot on an edge of a depth image according to an implementation of the present disclosure.

As illustrated in FIG. 3, the device includes a collecting module 310, a first calculating module 320, a second calculating module 330, a judging module 340, and a determining module 350.

The collecting module 310 is configured to collect image data of the depth image. The first calculating module 320 is configured to calculate a normal vector of each pixel of the depth image according to the image data. The second calculating module 330 is configured to calculate, according to the normal vector, an edge point of the depth image with an edge detection operator. The judging module 340 is configured to take the edge point as a seed point and determine whether the seed point satisfies a growing condition. The determining module 350 is configured to determine the seed point as the flying spot when the seed point satisfies the growing condition.

Figure 4:
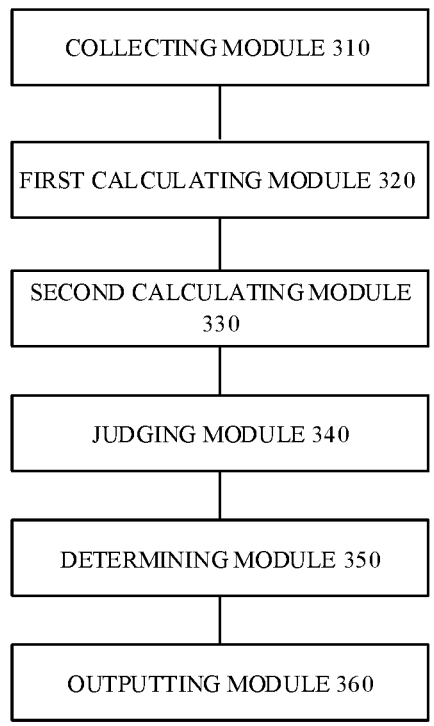
FIG. 4 is a structural block diagram of a device for detecting a flying spot on an edge of a depth image according to another implementation of the present disclosure.

In another implementation, as illustrated in FIG. 4, the device further includes an outputting module 360.

The outputting module 360 is configured to remove the flying spot after the determining module determines the seed point as the flying spot, and output the depth image according to image data with the flying spot removed.

It should be noted that, the foregoing description of the method for detecting a flying spot on an edge of a depth image is also applicable to the device for detecting a flying spot on an edge of a depth image provided herein. Details not described in device/apparatus implementations will not be elaborated herein.

With aid of the device for detecting a flying spot on an edge of a depth image, the collecting module collects the image data of the depth image. The first calculating module calculates the normal vector of each pixel of the depth image according to the image data. The second calculating module calculates, according to the normal vector, the edge point of the depth image with the edge detection operator. The judging module takes the edge point as the seed point and determines whether the seed point satisfies the growing condition. The determining module determines the seed point as the flying spot when the seed point satisfies the growing condition. In this way, the flying spot which affects the depth image can be detected effectively and accurately and effective pixels can be kept, which improves accuracy rate of detection.

To realize the above implementations, an electronic device is provided. The electronic device includes at least one processor and a computer readable storage. The computer readable storage is coupled to the at least one processor and stores at least one computer executable instruction thereon which, when executed by the at least one processor, causes the at least one processor to carry out any of the forgoing methods of the present disclosure.

To realize the above implementations, a non-transitory computer readable storage medium is provided. The non-transitory computer readable storage medium is configured to store a computer program which, when executed by a processor, causes the processor to carry out any of the forgoing methods of the present disclosure.

In the description of the specification, the description of reference terms "an implementation", "some implementations", "examples", "specific examples", "some examples", or the like means that specific features, structures, materials, or characteristics described in connection with the implementation or example are included in at least one implementation or example of the disclosure. In the specification, the schematic representation of the above terms is not necessarily directed to the same implementation or example. In addition, the specific features, structures, materials, or characteristics described may be combined in a suitable manner in any one or more implementations or examples. Furthermore, in the case of no conflict, those skilled in the art may combine various implementations or examples as well as features thereof described in the specification.

In addition, the terms "first" and "second" are used for description only and are not to be construed as indicating or implying a relative importance or implicitly indicating the number of technical features indicated. Thus, features defined by "first" or "second" may include at least one of the features, either explicitly or implicitly. In the description of the disclosure, "multiple" and "a plurality of" mean at least two, such as two, three, etc., unless specifically defined otherwise.

Description of any process or method in a flowchart or in other manners herein can be comprehended as including a module, a segment, or a portion of executable program codes of one or more steps for implementing custom logic functions or processes. In addition, it should be appreciated by those skilled in the art that, the scope of the implementations of the present disclosure includes other implementations, in which functions can be executed in an order different from that illustrated or discussed, for example, the functions are executed approximately at the same time or executed in an opposite order.

The logic and/or steps illustrated in a flowchart or described in other manners herein can, for example, be considered as a sequence list of an executable program or instruction for implementing logical functions, be embodied in any computer readable medium for use by, or in connection with, a system, apparatus, or device for executing instructions (such as a computer-based system, a system including a processor, or other systems that can read instructions from the system, apparatus, or device for executing instructions and execute the instructions). As to the specification, the "computer readable medium" can be any apparatus which can include, store, communicate, emit, or propagate programs for use by, or in connection with, the system, apparatus, or device for executing instructions. Examples (non-exhaustive) of the computer readable medium include an electrical connection portion (electronic device) including one or more wires, a portable computer disk box (magnetic device), a random access memory (RAM), a read-only memory (ROM), an erasable programmable read-only memory (EPROM, or flash memory), an optical fiber device, and a compact disc read-only memory (CDROM). In addition, the "computer readable medium" can even be paper or other suitable media upon which the programs can be printed, for example, an optical scanning can be conducted on paper or other media, then the programs are compiled and interpreted or otherwise processed in a suitable manner when necessary, to obtain the programs in an electronic manner, and thereafter the programs are stored in a memory of a computer.

It should be understood that, portions of the present disclosure can be implemented in hardware, software, firmware, or a combination thereof. In the above implementations, multiple steps or methods may be realized by software or firmware that is stored in the memory and executed by an appropriate instruction executing system. For example, when multiple steps or methods are implemented in hardware, like in another implementation, any one of the following which are known in the art or a combination thereof can be adopted: a discrete logic circuit of a logic gate for implementing a logical function on data signals, an application specific integrated circuit (ASIC) with an appropriate combinational logic gate, a programmable gate array (PGA), a field programmable gate array (FPGA), and the like.

It can be appreciated by those skilled in the art that, all or part of steps of the method of the above implementations can be completed by means of instructing relevant hardware through a program. The program can be stored in a computer readable storage medium, and when executed, the program includes any one or a combination of the steps in the method implementations.

In addition, functional units of the implementations of the disclosure can be integrated into a processing module or physically separated, or two or more units may be integrated into a module. The above integrated module can be implemented in hardware or as a software functional module. If the integrated module is implemented as a software functional module and sold or used as standalone products, it may be stored in a computer readable storage medium.

The above storage medium can be a ROM, a magnetic disk, an optical disk, or the like. While the disclosure has been described in connection with certain implementations, it is to be understood that the above implementations are illustrative and cannot be understood as limitations on the disclosure. Those of ordinary skill in the art can conduct various changes, modifications, substitutions, and alternations on the above implementations without departing from the scope of the disclosure.

What is claimed is:

1. A method for detecting a flying spot on an edge of a depth image, comprising:
   collecting image data of the depth image;
   acquiring a first vector of each pixel of the depth image according to the image data;
   acquiring a second vector and a third vector of neighboring pixels of each pixel, wherein the second vector and the third vector are obtained by querying serial numbers of threads of a graphic processing unit (GPU);
   calculating a normal vector of each pixel according to the first vector, the second vector, and the third vector;
   calculating, according to the normal vector, an edge point of the depth image with an edge detection operator;
   taking the edge point as a seed point and determining whether the seed point satisfies a growing condition; and
   determining the seed point as the flying spot, upon determining that the seed point satisfies the growing condition.

2. The method of claim 1, wherein collecting the image data of the depth image comprises:
   emitting, with an infrared emitter, an infrared signal to a subject, and recording a first time point at which the infrared signal is emitted;
   receiving, with an infrared receiver, an infrared signal reflected back from the subject, and recording a second time point at which the infrared signal reflected is received;
   calculating a difference between the first time point and the second time point; and
   obtaining the image data according to the difference.

3. The method of claim 1, wherein taking the edge point as the seed point and determining whether the seed point satisfies the growing condition comprises:
   acquiring a first normal vector of the seed point;
   acquiring a second normal vector of each of neighboring pixels of the seed point;
   calculating an absolute value of a product of the first normal vector and the second normal vector; and
   determining whether the absolute value is less than a preset threshold.

4. The method of claim 3, further comprising:
   determining the seed point as the flying spot based on a determination that the absolute value is less than the preset threshold.

5. The method of claim 1, further comprising:
   after determining the seed point as the flying spot:
   removing the flying spot; and
   outputting the depth image according to image data with the flying spot removed.

6. The method of claim 1, wherein the edge detection operator comprises a sobel operator.

7. An electronic device, comprising:
   at least one processor; and
   a computer readable storage, coupled to the at least one processor and storing at least one computer executable instruction thereon which, when executed by the at least one processor, causes the at least one processor to carry out actions, comprising:
   collecting image data of a depth image;
   acquiring a first vector of each pixel of the depth image according to the image data;
   acquiring a second vector and a third vector of neighboring pixels of each pixel, wherein the second vector and the third vector are obtained by querying serial numbers of threads of a graphic processing unit (GPU);
   calculating a normal vector of each pixel image according to the first vector, the second vector, and the third vector;
   calculating, according to the normal vector, an edge point of the depth image with an edge detection operator;
   taking the edge point as a seed point and determining whether the seed point satisfies a growing condition; and
   determining the seed point as a flying spot, upon determining that the seed point satisfies the growing condition.

8. The electronic device of claim 7, wherein the at least one processor configured to carry out collecting the image data of the depth image is configured to carry out actions, comprising:
   emitting, with an infrared emitter, an infrared signal to a subject, and recording a first time point at which the infrared signal is emitted;
   receiving, with an infrared receiver, an infrared signal reflected back from the subject, and recording a second time point at which the infrared signal reflected is received;
   calculating a difference between the first time point and the second time point; and
   obtaining the image data according to the difference.

9. The electronic device of claim 7, wherein the at least one processor configured to carry out taking the edge point as the seed point and determining whether the seed point satisfies the growing condition is configured to carry out actions, comprising:
   acquiring a first normal vector of the seed point;
   acquiring a second normal vector of each of neighboring pixels of the seed point;
   calculating an absolute value of a product of the first normal vector and the second normal vector; and
   determining whether the absolute value is less than a preset threshold.

10. The electronic device of claim 9, the at least one processor is further configured to carry out actions, comprising:
    determining the seed point as the flying spot based on a determination that the absolute value is less than the preset threshold.

11. The electronic device of claim 7, the at least one processor is further configured to carry out actions, comprising:
    removing the flying spot; and
    outputting the depth image according to image data with the flying spot removed.

12. The electronic device of claim 7, wherein the edge detection operator comprises a sobel operator.

13. A non-transitory computer readable storage medium storing a computer program which, when executed by a processor, causes the processor to carry out actions, comprising:
    collecting image data of a depth image;
    acquiring a first vector of each pixel of the depth image according to the image data;
    acquiring a second vector and a third vector of neighboring pixels of each pixel, wherein the second vector and the third vector are obtained by querying serial numbers of threads of a graphic processing unit (GPU);

calculating a normal vector of each pixel according to the first vector, the second vector, and the third vector;

calculating, according to the normal vector, an edge point of the depth image with an edge detection operator;

taking the edge point as a seed point and determining whether the seed point satisfies a growing condition; and determining the seed point as a flying spot, upon determining that the seed point satisfies the growing condition.

14. The non-transitory computer readable storage medium of claim 13, wherein the computer program executed by the processor to carry out the action of collecting the image data of the depth image is executed by the processor to carry out actions, comprising:

emitting, with an infrared emitter, an infrared signal to a subject, and recording a first time point at which the infrared signal is emitted;

receiving, with an infrared receiver, an infrared signal reflected back from the subject, and recording a second time point at which the infrared signal reflected is received;

calculating a difference between the first time point and the second time point; and obtaining the image data according to the difference.

15. The non-transitory computer readable storage medium of claim 13, wherein the computer program executed by the processor to carry out the action of taking the edge point as the seed point and determining whether the seed point satisfies the growing condition is executed by the processor to carry out actions, comprising:

acquiring a first normal vector of the seed point;

acquiring a second normal vector of each of neighboring pixels of the seed point;

calculating an absolute value of a product of the first normal vector and the second normal vector; and determining whether the absolute value is less than a preset threshold.

\* \* \* \* \*